(12) United States Patent
Cheng

(10) Patent No.: US 10,368,400 B2
(45) Date of Patent: Jul. 30, 2019

(54) METHOD AND PACKAGE FOR PACKAGING A THERMAL CONDUCTIVE STRIP WITH POWER SUPPLY TERMINALS

(71) Applicant: TAIWAN TECH CO., LTD., Changhua County (TW)

(72) Inventor: Chen-San Cheng, Changhua County (TW)

(73) Assignee: TAIWAN TECH CO., LTD., Changhua County (TW)

( * ) Notice: Subject to any disclaimer, the term of this patent is extended or adjusted under 35 U.S.C. 154(b) by 398 days.

(21) Appl. No.: 15/207,489

(22) Filed: Jul. 11, 2016

(65) Prior Publication Data

US 2018/0014356 A1 Jan. 11, 2018

(51) Int. Cl.
| | |
|---|---|
| *H05B 3/14* | (2006.01) |
| *H05B 3/34* | (2006.01) |
| *B32B 38/10* | (2006.01) |
| *H05B 3/06* | (2006.01) |
| *B29K 101/12* | (2006.01) |
| *B29L 31/00* | (2006.01) |

(52) U.S. Cl.
CPC ............ *H05B 3/145* (2013.01); *B32B 38/10* (2013.01); *H05B 3/06* (2013.01); *H05B 3/342* (2013.01); *B29K 2101/12* (2013.01); *B29K 2995/0013* (2013.01); *B29L 2031/779* (2013.01); *B32B 2262/106* (2013.01)

(58) Field of Classification Search
CPC .......... H05B 3/145; H05B 3/03; H05B 3/342; B29C 65/64; B29C 69/00; B29K 2101/12; B29K 2995/0013; B29L 2031/779
See application file for complete search history.

(56) References Cited

U.S. PATENT DOCUMENTS 4,252,990 A * 2/1981 Sado ..................... H01C 1/02
174/541

\* cited by examiner

*Primary Examiner* — Shawntina T Fuqua
(74) *Attorney, Agent, or Firm* — Bruce Stone LLP; Joseph Bruce

(57) ABSTRACT

A thermal conductive strip with a power supply terminal includes: a carbon fiber unit including a carbon fiber connecting end; a plastic envelope which encapsulates the carbon fiber unit and has a length smaller than a length of the carbon fiber connecting end, and further includes a broken portion which covers a part of the carbon fiber connecting end; and the power supply terminal sleeved onto the broken portion and the carbon fiber connecting end, and including a clamping section for clamping the broken portion, and an electrically conductive section for contacting the carbon fiber connecting end. The power supply terminal is partially clamped on the plastic envelope and partially eclectically connected to the carbon fiber, which improves the yield rate and the bending durability of the thermal conductive strip of the present invention.

8 Claims, 7 Drawing Sheets

METHOD AND PACKAGE FOR PACKAGING A THERMAL CONDUCTIVE STRIP WITH POWER SUPPLY TERMINALS

BACKGROUND

Field of the Invention

The present invention relates to a thermal conductive strip, and more particularly to a method and package for packaging a thermal conductive strip with power supply terminals.

Related Prior Art

Flexible, lightweight and thin thermal conductive strips are widely used in clothes, knee pads, waist support, gloves, insoles, earmuffs and etc, to provide warmth to the body.

As shown in FIG. 1, a method for making a flexible and flat heater by using carbon fibers as heat source, comprise the following steps: preparing carbon fibers 12; placing thermoplastic materials at two opposite sides of the carbon fiber; bonding the thermoplastic materials together by heating and rolling method to encapsulate the carbon fibers; and providing a power supply terminal at each of two opposite ends of the carbon fiber. The flexible and flat heater can be widely used in the small items, including clothes, waist support and gloves, or in the large items, such as quilts and blankets, as a warmth source providing warmth to the wearers.

However, as shown in FIG. 1, before packaging the power supply terminals 11 of the heat conductive strip 10, the carbon fibers 12 have a connecting section 121 exposed out of two ends of the thermoplastic envelope 13, and the power supply terminals 11 are directly clamped on the connecting section 121 during the packaging process. Therefore, the power supply terminals 11 are likely to cut the connecting section 121, which results in high rejection ratio. Besides, when the power supply terminals 11 are bent repeatedly with respect to the thermoplastic envelope 13, some of the carbon fibers 12 are likely to be ripped off.

The present invention has arisen to mitigate and/or obviate the afore-described disadvantages.

SUMMARY

The present invention is aimed at providing a method and package for packaging a thermal conductive strip with power supply terminals, wherein the power supply terminal is partially clamped on the plastic envelope and partially eclectically connected to the carbon fiber, which improves the yield rate and the bending durability of the thermal conductive strip of the present invention.

Therefore, a method for packaging a thermal conductive strip with a power supply terminal in accordance with a preferred embodiment of the present invention comprises the following steps:

preparing a plastic envelope which encapsulates a carbon fiber unit, wherein the plastic envelope includes a plastic connecting end, and the carbon fiber unit includes a carbon fiber connecting end which is encapsulated by the plastic connecting end;

clamping the plastic envelope with a positioning mould to fix one end of the plastic envelope;

clamping a pulling mould on the plastic connecting end while the carbon fiber connecting end is not clamped by the pulling mould;

pulling the pulling mould in a direction away from the positioning mould until a part of the plastic connecting end breaks to form a broken portion, so that the carbon fiber connecting end is exposed out of the plastic envelope, wherein the broken portion covers a part of the carbon fiber connecting end;

sleeving the power supply terminal onto the broken portion and the carbon fiber connecting end, adding pressure to make the power supply terminal have a clamping section for clamping the broken portion, and an electrically conductive section for contacting the carbon fiber connecting end.

Therefore, a thermal conductive strip with a power supply terminal in accordance with a preferred embodiment of the present invention comprises: a carbon fiber unit including a carbon fiber connecting end; a plastic envelope which encapsulates the carbon fiber unit and has a length smaller than a length of the carbon fiber connecting end, and further includes a broken portion which covers a part of the carbon fiber connecting end; and the power supply terminal sleeved onto the broken portion and the carbon fiber connecting end, and including a clamping section for clamping the broken portion, and an electrically conductive section for contacting the carbon fiber connecting end.

Preferably, the broken portion has a maximum length of 3 cm, and a length of the power supply terminal is larger than 3 cm and smaller than or equal to 10 cm.

Preferably, a thickness of the power supply terminal is at least 0.3 cm.

Preferably, a pulling force produced by the pulling mould is at least 3 kg/cm$^2$.

Preferably, a width of the power supply terminal after adding pressure is smaller than a width of the plastic envelope.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
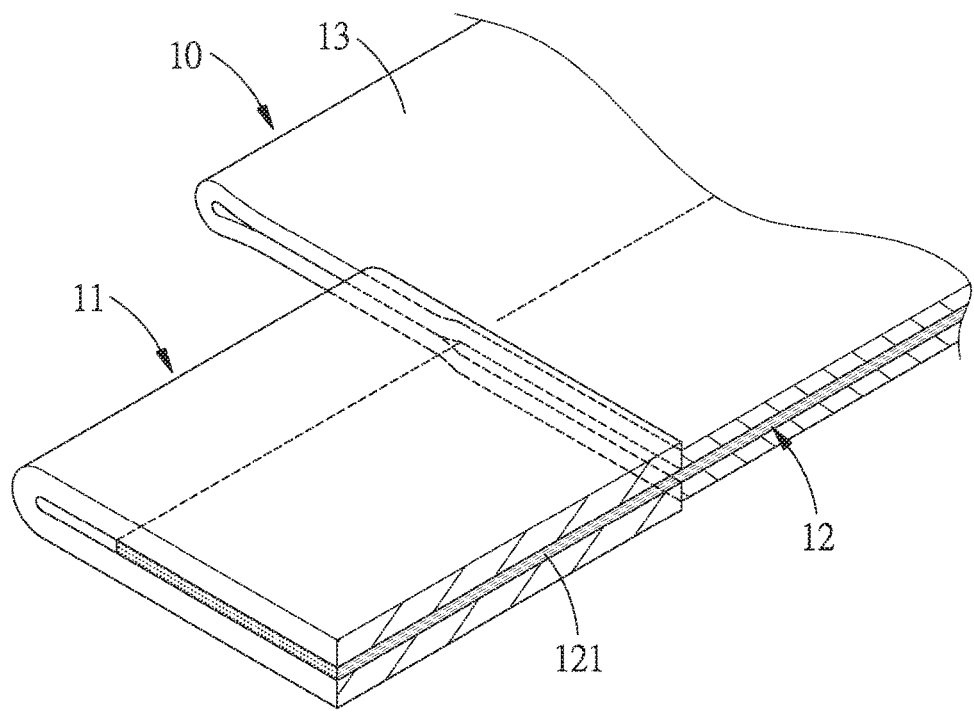
FIG. 1 is a perspective view of a conventional thermal conductive strip.
Figure 2:
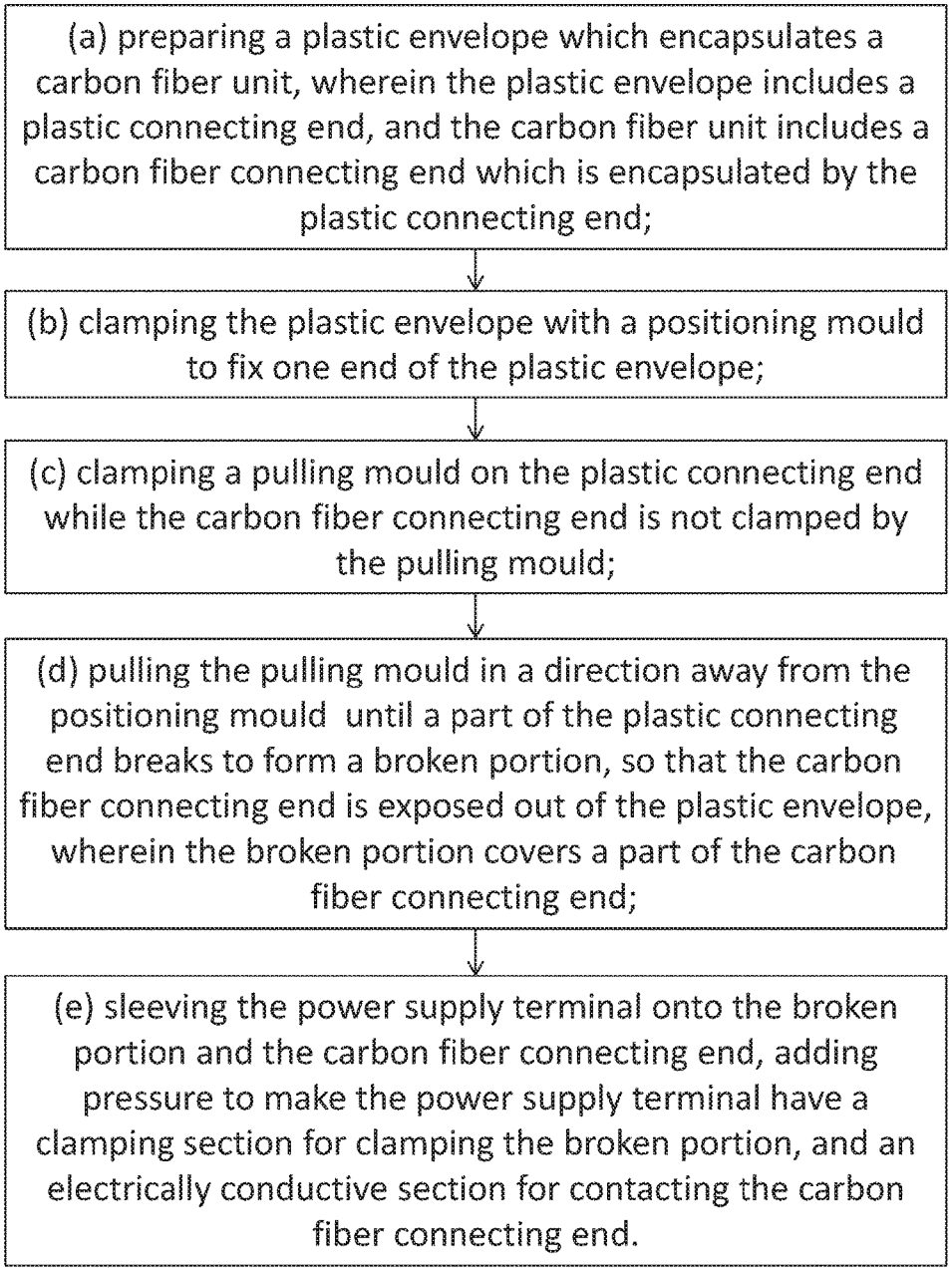
FIG. 2 is a flow chart showing the method for packaging a thermal conductive strip with power supply terminals in accordance with the preferred embodiment of the present invention.
Figure 3:
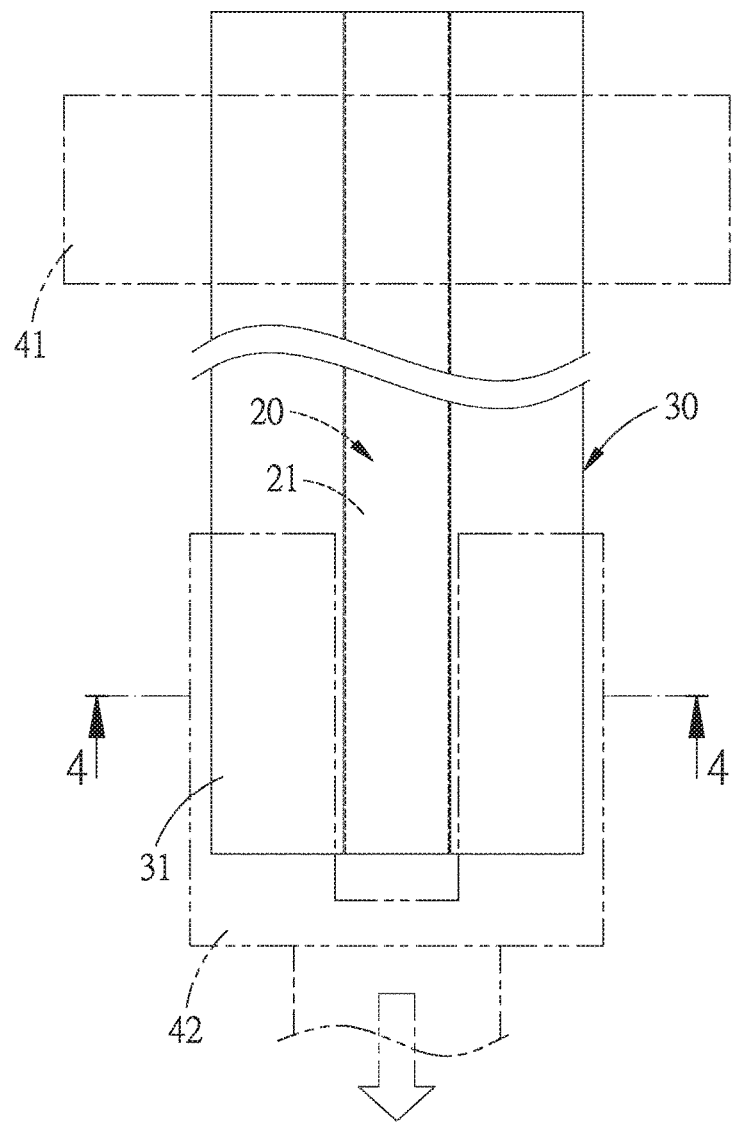
FIG. 3 is an illustrative view showing that one end of the plastic envelope is clamped by the positioning mould, and another end of which is pulled by the pulling mould.
Figure 4:
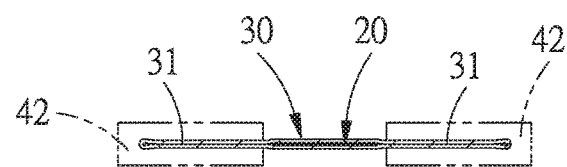
FIG. 4 is a cross sectional view taken along the line 4-4 of FIG. 3.
Figure 5:
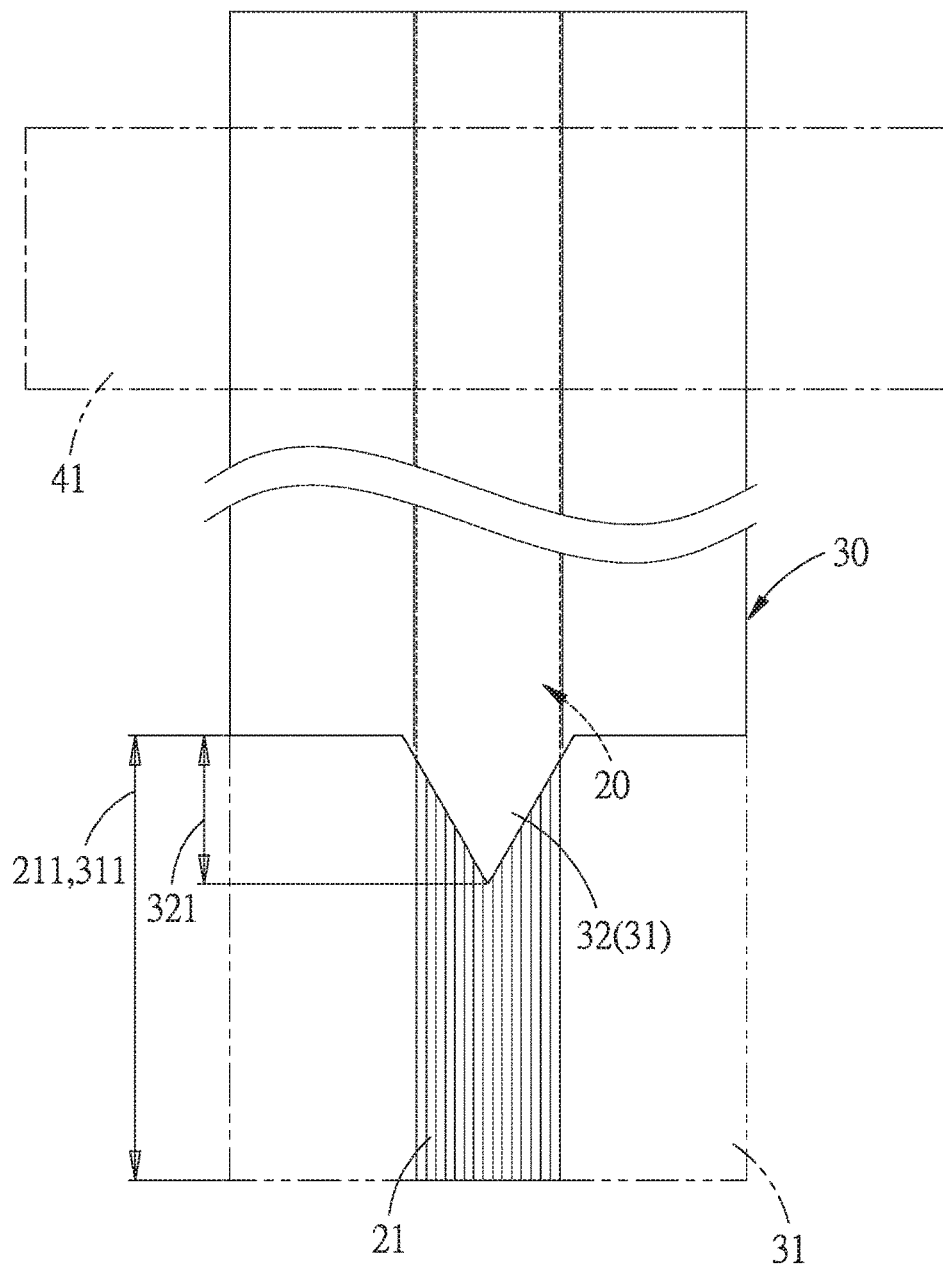
FIG. 5 is an illustrative view of the present invention showing that the pulling mould is pulled in a direction away from the positioning mould until a part of the plastic connecting end breaks to form a broken portion.
Figure 6:
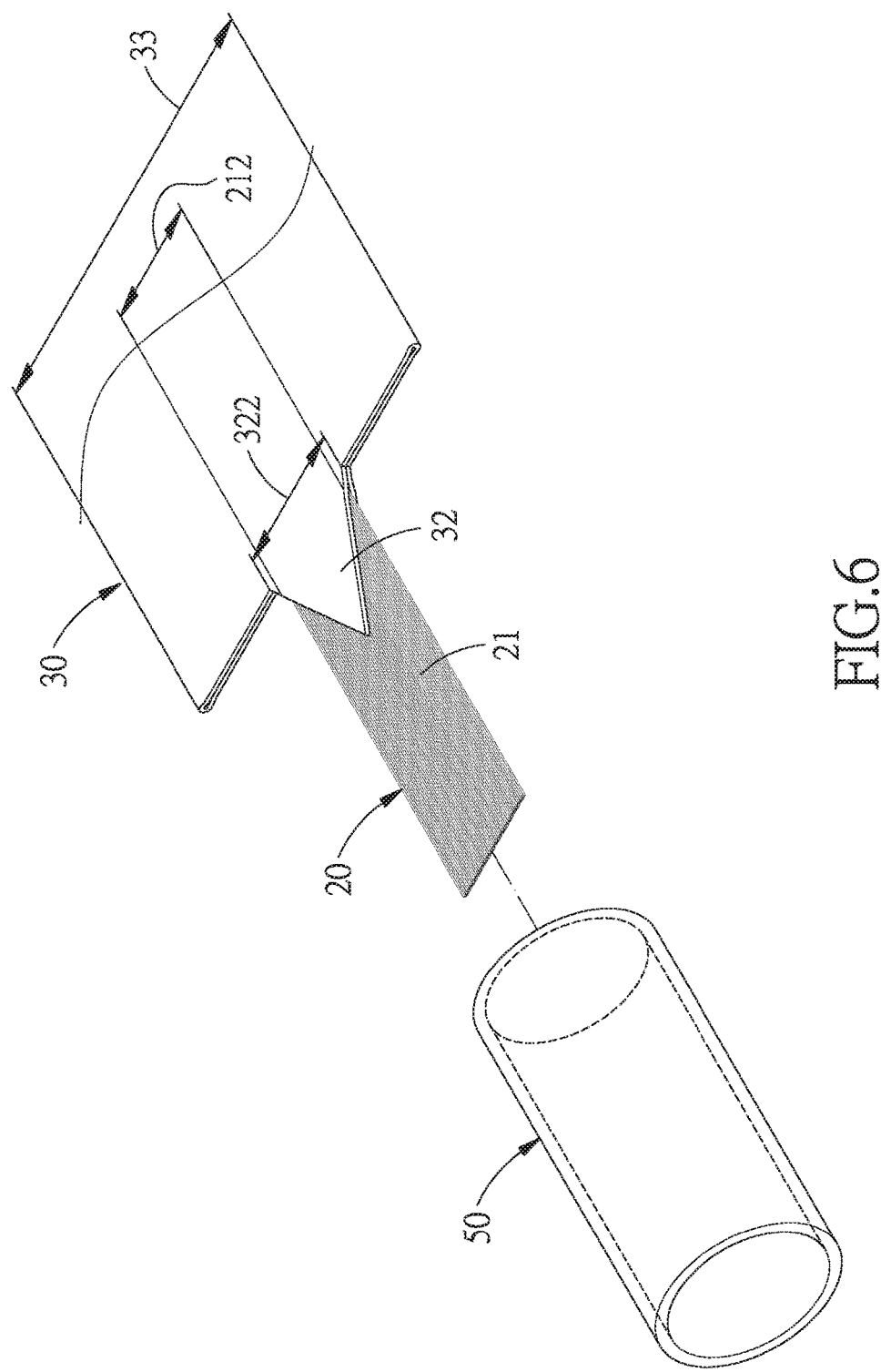
FIG. 6 is an illustrative view of the present invention showing the state before the power supply terminal is sleeved onto the carbon fiber unit.
Figure 7:
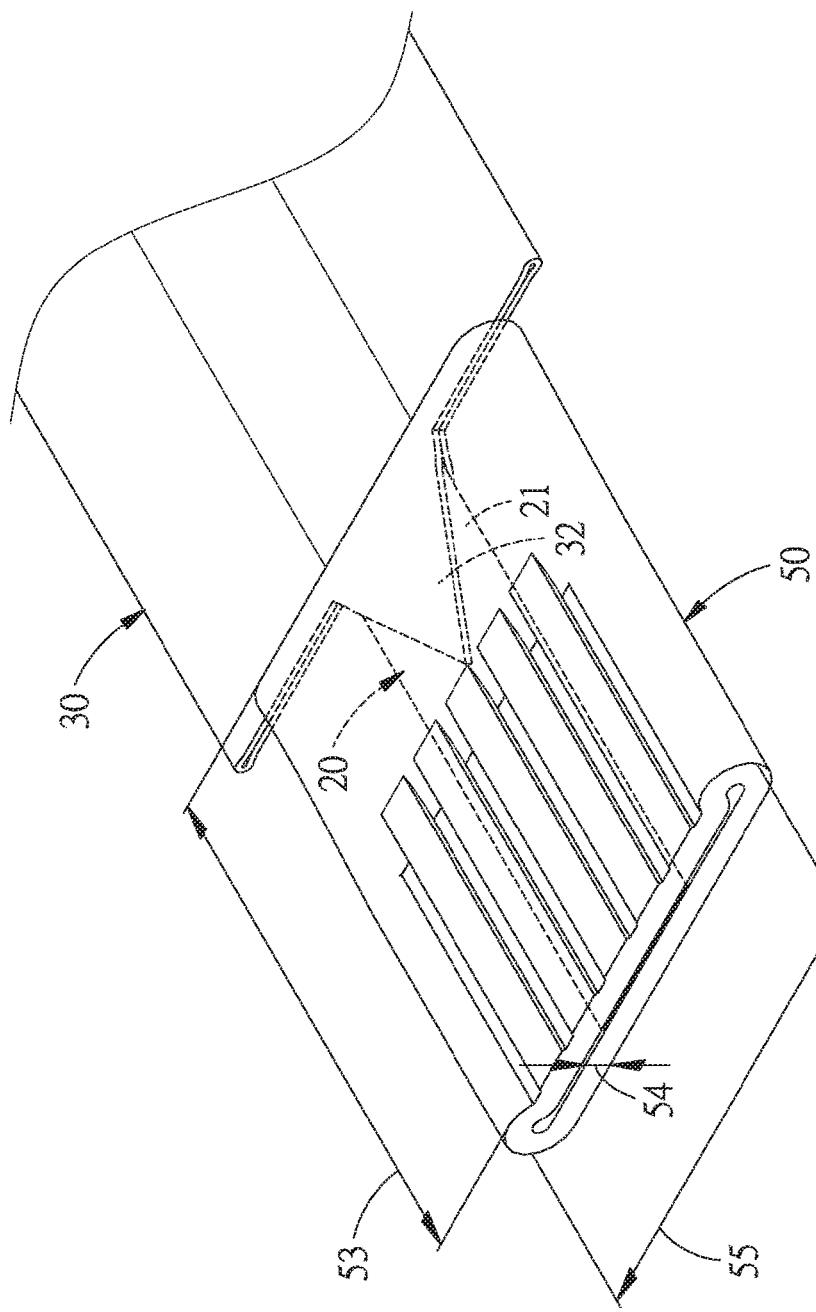
FIG. 7 is an illustrative view of the present invention showing the condition of the power supply terminal after adding pressure.
Figure 8:
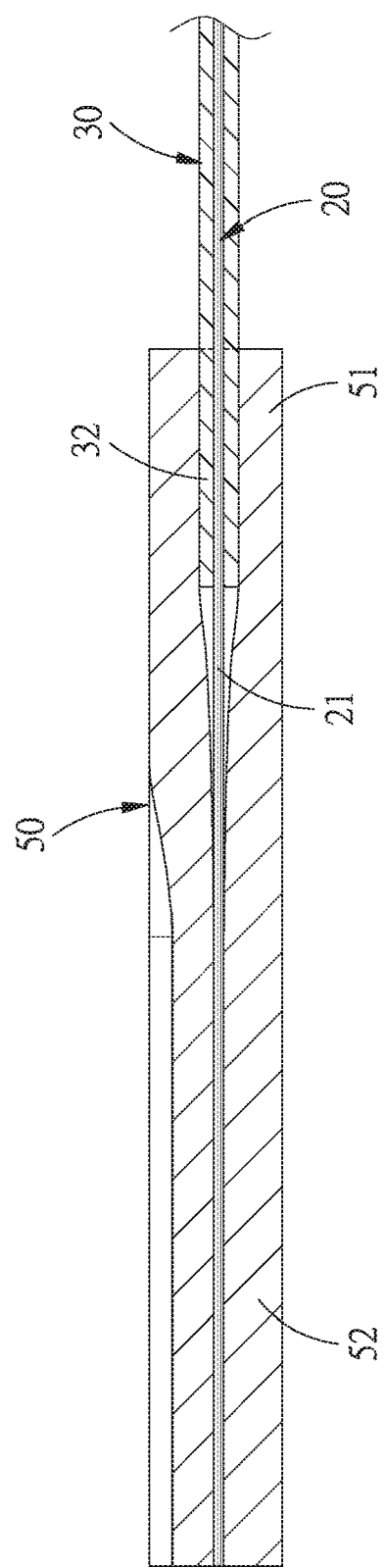
FIG. 8 is a cross sectional view of the present invention showing the state after the power supply terminal is sleeved onto the carbon fiber unit.

Referring to FIGS. 2-8, a method for packaging a thermal conductive strip with power supply terminals in accordance with the preferred embodiment of the present invention, comprises the following steps:

a) preparing a plastic envelope 30 which encapsulates a carbon fiber unit 20, wherein the plastic envelope 30 includes a plastic connecting end 31, and the carbon fiber unit 20 includes a carbon fiber connecting end 21 which is encapsulated by the plastic connecting end 31. In this embodiment, a length 311 of the plastic connecting end 31 and a length 211 of the carbon fiber connecting end 21 are equal to each other and both are 6 cm.

b) clamping the plastic envelope 30 with a positioning mould 41 to fix one end of the plastic envelope 30.

c) clamping a pulling mould 42 on the plastic connecting end 31 while the carbon fiber connecting end 21 is not clamped by the pulling mould 42; in other words, the pulling mould 42 is clamped at two sides of the plastic connecting end 31 while keeping away from the carbon fiber connecting end 21, so as to prevent breaking the carbon fiber connecting end 21 during the following steps.

d) pulling the pulling mould 42 in a direction away from the positioning mould 41 until a part of the plastic connecting end 31 breaks to form a broken portion 32, so that the carbon fiber connecting end 21 is exposed out of the plastic envelope 30, wherein the broken portion 32 covers a part of the carbon fiber connecting end 21, namely, a part of the broken portion 32 has a width 322 wider than a width 212 of the carbon fiber connecting end 21. In this embodiment, the pulling mould 42 generates a pulling force at least 3 kg/cm$^2$, and the length 321 of the broken portion 32 is 3 cm.

e) sleeving a power supply terminal 50 onto the broken portion 32 and the carbon fiber connecting end 21, adding pressure to make the power supply terminal 50 have a clamping section 51 for clamping the broken portion 32, and an electrically conductive section 52 for contacting the carbon fiber connecting end 21. In this embodiment, the power supply terminal 50 has a length 53 of 6 cm, which is a not a limit to the length, and the length of the power supply terminal 50 can also be larger than 3 cm and smaller than or equal to 10 cm. The power supply terminal 50 has a thickness 54 of 0.3 cm, and a width 55 of the power supply terminal 50 after adding pressure is smaller than the width 33 of the plastic envelope 30.

A thermal conductive strip with a power supply terminal made by the abovementioned method comprises: the carbon fiber unit 20, the plastic envelope 30 and the power supply terminal 50.

The carbon fiber unit 20 includes the carbon fiber connecting end 21.

The plastic envelope 30 encapsulates the carbon fiber unit 20 and has a length 321 smaller than the length 211 of the carbon fiber connecting end 21, and further includes the broken portion 32 which covers a part of the carbon fiber connecting end 21.

The power supply terminal 50 is sleeved onto the broken portion 32 and the carbon fiber connecting end 21, and includes the clamping section 51 for clamping the broken portion 32, and the electrically conductive section 52 for contacting the carbon fiber connecting end 21.

By such arrangements, the plastic envelope 30 of the present invention is provided with the broken portion 32 which covers a part of the carbon fiber connecting end 21, so that the carbon fiber connecting end 21 is exposed out of the plastic envelope 30. During the process of packing the power supply terminal 50, the clamping section 51 is clamped on the broken portion 32, and the electrically conductive section 52 is electrically connected to the carbon fiber connecting end 21. Therefore, the power supply terminal 50 is clamped at the broken portion 32 and electrically connected to the carbon fiber connecting end 21. Clamping the power supply terminal 50 at the broken portion 32 can prevent breaking of the carbon fiber unit 20 during the packaging process if the power supply terminal 50 is clamped directly on the carbon fiber unit 20, and prevent the carbon fiber unit 20 from being ripped off when the power supply terminal 50 is bent repeatedly with respect to the plastic envelope 30. Therefore, the yield rate and the bending durability of the present invention are improved.

It is to be noted that the reason why the length 321 of the broken portion 32 is designed to be 3 cm, is because during the welding process of the power supply terminal 50 and if the length 321 is longer than 3 cm, the broken portion 32 will melt, which adversely affects the connection stability between the power supply terminal 50 and the plastic envelope 30.

The length of the power supply terminal 50 is larger than 3 cm and smaller than or equal to 10 cm, so that, during the packaging process, the power supply terminal 50 can be clamped on the broken portion 32 and electrically connected to the carbon fiber unit 20, which improves the yield rate and the bending durability of the thermal conductive strip while ensuring that the thermal conductive strip can produce heat.

The thickness 54 of the power supply terminal 50 is designed to be 0.3 cm in order to prevent the thermal conductive strip having a too large resistance and too much local heat accumulation after encapsulation of the power supply terminal 50.

While we have shown and described various embodiments in accordance with the present invention, it is clear to those skilled in the art that further embodiments may be made without departing from the scope of the present invention.

What is claimed is:

1. A method for packaging a thermal conductive strip with a power supply terminal, comprising the following steps:
    preparing a plastic envelope which encapsulates a carbon fiber unit, wherein the plastic envelope includes a plastic connecting end, and the carbon fiber unit includes a carbon fiber connecting end which is encapsulated by the plastic connecting end;
    clamping the plastic envelope with a positioning mould to fix one end of the plastic envelope;
    clamping a pulling mould on the plastic connecting end while the carbon fiber connecting end is not clamped by the pulling mould;
    pulling the pulling mould in a direction away from the positioning mould until a part of the plastic connecting end breaks to form a broken portion, so that the carbon fiber connecting end is exposed out of the plastic envelope, wherein the broken portion covers a part of the carbon fiber connecting end;

sleeving the power supply terminal onto the broken portion and the carbon fiber connecting end, adding pressure to make the power supply terminal have a clamping section for clamping the broken portion, and an electrically conductive section for contacting the carbon fiber connecting end.

2. The method as claimed in claim 1, wherein the broken portion has a maximum length of 3 cm, and a length of the power supply terminal is larger than 3 cm and smaller than or equal to 10 cm.

3. The method as claimed in claim 1, wherein a thickness of the power supply terminal is at least 0.3 cm.

4. The method as claimed in claim 1, wherein a pulling force produced by the pulling mould is at least 3 kg/cm².

5. The method as claimed in claim 1, wherein a width of the power supply terminal after adding pressure is smaller than a width of the plastic envelope.

6. A thermal conductive strip with a power supply terminal, comprising:
   a carbon fiber unit including a carbon fiber connecting end;
   a plastic envelope which encapsulates the carbon fiber unit and has a length smaller than a length of the carbon fiber connecting end, and further includes a broken portion which covers a part of the carbon fiber connecting end; and
   the power supply terminal sleeved onto the broken portion and the carbon fiber connecting end, and including a clamping section for clamping the broken portion, and an electrically conductive section for contacting the carbon fiber connecting end;
   wherein a width of the power supply terminal is smaller than a width of the plastic envelope.

7. The thermal conductive strip as claimed in claim 6, wherein the broken portion has a maximum length of 3 cm, and a length of the power supply terminal is larger than 3 cm and smaller than or equal to 10 cm.

8. The thermal conductive strip as claimed in claim 6, wherein a thickness of the power supply terminal is at least 0.3 cm.

* * * * *